US006832166B2

(12) United States Patent
Schutzbach

(10) Patent No.: US 6,832,166 B2
(45) Date of Patent: Dec. 14, 2004

(54) METHOD AND SYSTEM FOR ANALYZING THE EFFECT OF INFLOW AND INFILTRATION ON A SEWER SYSTEM

(75) Inventor: James S. Schutzbach, Madison, AL (US)

(73) Assignee: ADS Corporation, Huntsville, AL (US)

( * ) Notice: Subject to any disclaimer, the term of this patent is extended or adjusted under 35 U.S.C. 154(b) by 0 days.

(21) Appl. No.: 10/724,392

(22) Filed: Dec. 1, 2003

(65) Prior Publication Data

US 2004/0138816 A1 Jul. 15, 2004

Related U.S. Application Data

(63) Continuation of application No. 10/146,815, filed on May 17, 2002, now Pat. No. 6,701,261.

(51) Int. Cl.$^7$ .............................. G06F 19/00; G01F 7/00
(52) U.S. Cl. .............................. 702/50; 702/45; 702/55; 702/100; 73/195
(58) Field of Search .............................. 702/45, 50, 55, 702/66, 67, 100, 156, 176, 188; 73/195, 215, 861.23, 861.63; 137/1, 236.1

(56) References Cited

U.S. PATENT DOCUMENTS

| | | | |
|---|---|---|---|
| 4,070,563 A | 1/1978 | Petroff | 364/510 |
| 4,211,111 A | 7/1980 | Petroff | 73/195 |
| 4,295,197 A | 10/1981 | Petroff | 364/510 |
| 4,344,329 A | 8/1982 | Petroff | 73/861 |
| 4,397,191 A | 8/1983 | Forden | 73/861.68 |
| 4,407,158 A | 10/1983 | Petroff | 73/196 |
| 4,630,474 A | 12/1986 | Petroff | 73/196 |
| 5,198,989 A | 3/1993 | Petroff | 364/510 |
| 5,506,791 A | 4/1996 | Hungerford et al. | 364/510 |
| 5,608,171 A | 3/1997 | Hunter et al. | 73/861.63 |
| 6,474,357 B2 * | 11/2002 | Naski | 137/205 |
| 6,565,284 B2 * | 5/2003 | Gearhart | 405/37 |
| 6,701,261 B2 * | 3/2004 | Schutzbach | 702/50 |

OTHER PUBLICATIONS

WPI Database Abstract XP-002226805, Section PQ, Week 200151, Derwent Publications, Ltd., London, GB; Class Q42, AN 2001-469439, Abstract JP 2001 167078 A (Jun. 22, 2001).

WPI Database Abstract XP-002226804, Section PQ, Week 199938, Derwent Publications Ltd., London, GB; Class Q42, AN 1999-453293, Abstract of JP 11 190056 A (Jul. 13, 1999).

WPI Database Abstract XP-002226803, Section PQ, Week 199720, Derwent Publications Ltd., London, GB; Class Q42, AN 1997-216360, Abstract of JP 09 061545 A (Mar. 7, 1997).

Dent, S., "Continuous Simulation vs. Design Storms Comparison with Wet Weather Flow Prediction Methods", May 2000, published by Water Environment Federation.

Merrill, M.S., "New Dimensions in Infiltration/InFlow Analysis", Jul. 11, 1994, presented at Water Environment Specialty Conference, Louisville, Kentucky.

International Search Report for Corresponding PCT Application No. PCT/US02/15650 (Jan. 2003).

(List continued on next page.)

*Primary Examiner*—Bryan Bui
(74) *Attorney, Agent, or Firm*—Gilberto M. Villacorta; James A. Gromada; Katten Muchin Zavis Rosenman

(57) ABSTRACT

A method and system for determining the effect of precipitation on flow within a sewer network includes identifying a modeled response of the sewer to a precipitation event. Once the modeled response is identified, scaled responses to future precipitation events may be predicted, in real time, by measuring intervals of the precipitation event and calculating the scaled response as a function of the modeled response and the precipitation quantity measured during the precipitation event.

8 Claims, 9 Drawing Sheets

OTHER PUBLICATIONS

Dent, Shawn et al., "Continous Simulation vs. Design Storms Comparison with Wet Weather Flow Prediction Methods" May 2000, pp. 1–20, published by Water Environment Federation, Rochester, New York.

Merrill, M.S. et al., "New Dimensions in Infiltration/Inflow Analysis" Jul. 11, 1994, pp. 1–10, presented at Water Environment Speciality Conference, Louisville, Kentucky.

* cited by examiner

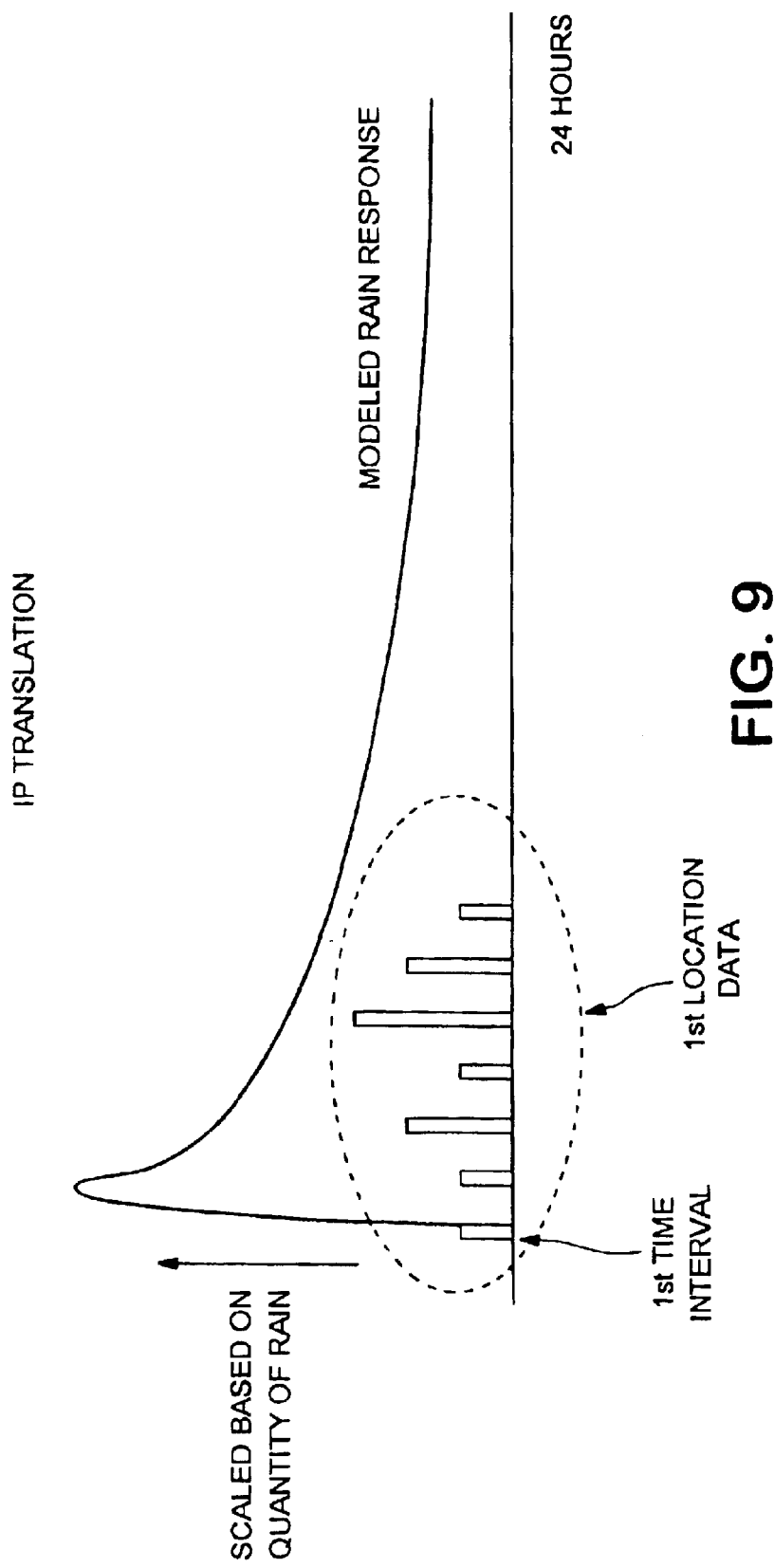

METHOD AND SYSTEM FOR ANALYZING THE EFFECT OF INFLOW AND INFILTRATION ON A SEWER SYSTEM

This application is a continuation of claims the benefit of U.S. application Ser. No. 10/146,815, filed May 17, 2002 U.S. Pat. No. 6,701,261. The entire contents of this prior application are incorporated herein by reference.

FIELD OF THE INVENTION

The present invention relates generally sewage flow monitoring and analysis systems. More particularly, the present invention relates to a method and system of analyzing and/or predicting the effect of the inflow and/or infiltration of precipitation on a sewer system.

BACKGROUND OF THE INVENTION

Tools for the accurate measurement of flow in a sewer network are an important resource for managers, mechanics, engineers, and regulators of municipal and industrial sewer networks. Accurate measurements of flow, and an understanding of what flow is expected to occur during a precipitation event, can help determine—and to predict—when network problems such as overflows, leaks, breaks, clogs, and other blockages and overflows may occur. They can also help system engineers and designers understand when additional capacity must be built into the system, as well as to help them better manage a network with its existing capacity.

Sewer network managers have attempted to analyze and predict what effect a rain event may have on a sewer network, but the prior attempts have been unsatisfactory because they do not provide for reliable, real-time prediction while the rain event occurs, but rather they involve the measurement of a rain event after it is completed and the comparison of the measured event to known data from previous similar events. In addition, the prior attempts to predict rain inflow and infiltration on a sewer network involved significant, detailed modeling efforts, using data relating to the design of the sewer network and/or network discharge sources. Such modeling exercises are time-consuming and costly, and the accuracy of the modeling results depends on how closely modeling conditions to match the conditions under which the modeling was developed.

Accordingly, it is desirable to provide an improved method of, and system for, analyzing and/or predicting the effect of inflow and/or infiltration on a sewer network. The present invention is directed to such a system and method.

SUMMARY OF THE INVENTION

It is therefore a feature and advantage of the present invention to provide an improved method of analyzing and/or predicting the effect of inflow and/or infiltration on a sewer network. It is also a feature and advantage of the present invention to provide an improved system for analyzing and/or predicting the effect of inflow and/or infiltration on a sewer network.

In accordance with a preferred embodiment of the present invention, a method of determining the effect of precipitation on flow within a sewer network includes the steps of collecting, at a first location, data representative of a measured rain quantity over a first time interval having a duration that is less than a twenty-four-hour period; maintaining, in a memory, data representative of a modeled rain response at a second location over a second time interval, the second time interval having a duration that is longer than the duration of the first time interval; calculating, in real time, a scaled rain response, the scaled rain response comprising a function of the modeled rain response and the measured rain quantity; and reporting, in real time, the scaled rain response.

Optionally, the second location is a location within a sewer network, and the calculating of the rain response requires no additional data relating to either the sewer network or any substance flowing within the sewer network. Also optionally, each modeled rain response is indicative of an anticipated increase in flow at the second location over the second time interval. The modeled rain response may be capable of graphical representation as a curve on a graph where a y-axis represents at least one of inflow and infiltration and an x-axis represents time. Also, the duration of the first time interval is preferably shorter than a duration of a corresponding precipitation event.

Optionally, the method includes the additional step of identifying a cumulative scaled rain response that corresponds to a sum of a plurality of scaled rain responses over a plurality of time intervals. The method may also include the additional steps of measuring, using a flow meter at the second location, data representative of a measured flow; subtracting a baseline flow from the measured flow to result in an adjusted flow; and comparing, using a processor, the adjusted flow to the scaled rain response to determine whether the adjusted flow substantially corresponds to the scaled rain response. The baseline flow preferably represents expected flow during a non-precipitation event. The comparing is preferably done using a goodness of fit test. If the comparing step determines that the adjusted flow and the scaled rain response do not substantially correspond, an alert may be reported.

In accordance with an alternate embodiment of the present invention, a method of predicting the effect of precipitation on flow within a sewer network includes the steps of collecting data representative of a first measured rain quantity over a first time interval at a first location; creating, using a processor, multiple possible rain responses, wherein each possible rain response represents a possible flow volume distribution at a second location over a second time interval, the second time interval being longer than the first time interval; measuring, using a flow monitor, a measured flow volume distribution at the second location over the second time interval; comparing, using the processor, the possible rain responses to the measured flow volume distribution; selecting, using the processor, a modeled rain response that is the possible rain response that most closely corresponds to the measured flow volume distribution; and storing the modeled rain response, the first measured rain quantity, and the first time interval in a memory.

Optionally, the method also includes the steps of collecting data representative of a second measured rain quantity over a third time interval at the first location; calculating, in real time by a processor, a scaled rain response comprising a function of the modeled rain response and the second measured rain quantity; and reporting, in real time, the scaled rain response.

Also optionally, the second location is a location within a sewer network, and the calculating of the rain response requires no additional data relating to either the sewer network or any substance flowing within the sewer network. Further, the selecting step may include a goodness of fit test on the measured flow volume distribution and the plurality of possible rain responses. Preferably, the modeled rain response is capable of graphical representation as a curve on a graph where a y-axis represents at least one of inflow and infiltration and an x-axis represents time. Also preferably, the first time interval has a duration that is shorter than a duration of a corresponding precipitation event.

As an additional option, the method may include the additional steps of measuring, using a flow meter at the second location, data representative of a measured flow; subtracting a baseline flow from the measured flow to result in an adjusted flow, the baseline flow corresponding to a non-precipitation event; and comparing, using a processor, the adjusted flow to the scaled rain response to determine whether the adjusted flow substantially corresponds to the scaled rain response. With this option, if the comparing step determines that the adjusted flow and the selected rain response do not substantially correspond, an alert may be reported.

In accordance with an additional alternate embodiment, a sewer network flow analysis system includes a processor, a memory in communication with the processor, and a rain gauge in communication with the processor. The processor is programmed to accept, from the rain gauge, data representative of a measured rain quantity over a first time interval that is less than a twenty-four-hour period. The memory maintains data representative of a modeled rain response at a location in a sewer network over a second time interval having a duration that is longer than the duration of the first time interval. The processor is further programmed to calculate, in real time, a scaled rain response comprising a function of the modeled rain response and the measured rain quantity. In addition, the processor is also programmed to report, in real time, the scaled rain response.

There have thus been outlined the more important features of the invention in order that the detailed description thereof that follows may be better understood, and in order that the present contribution to the art may be better appreciated. There are, of course, additional features of the invention that will be described below and which will form at least part of the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting in any way.

As such, those skilled in the art will appreciate that the concept and objectives, upon which this disclosure is based, may be readily utilized as a basis for the design of other structures, methods and systems for carrying out the several purposes of the present invention.

BRIEF DESCRIPTION OF THE DRAWINGS

FIG. 9 illustrates the development of a scaled rain response as a function of a quantity of rain and a modeled rain response.

DETAILED DESCRIPTION OF PREFERRED EMBODIMENTS OF THE INVENTION

A preferred embodiment of the present invention provides an improved method of analyzing and/or predicting the effects of inflow and infiltration on a sewer network. Once determined, the information and knowledge of these effects can be used to help sewer network managers detect discrepancies and/or unexpected network conditions, identify flow monitor malfunctions, and plan for system expansions.

Figure 1:
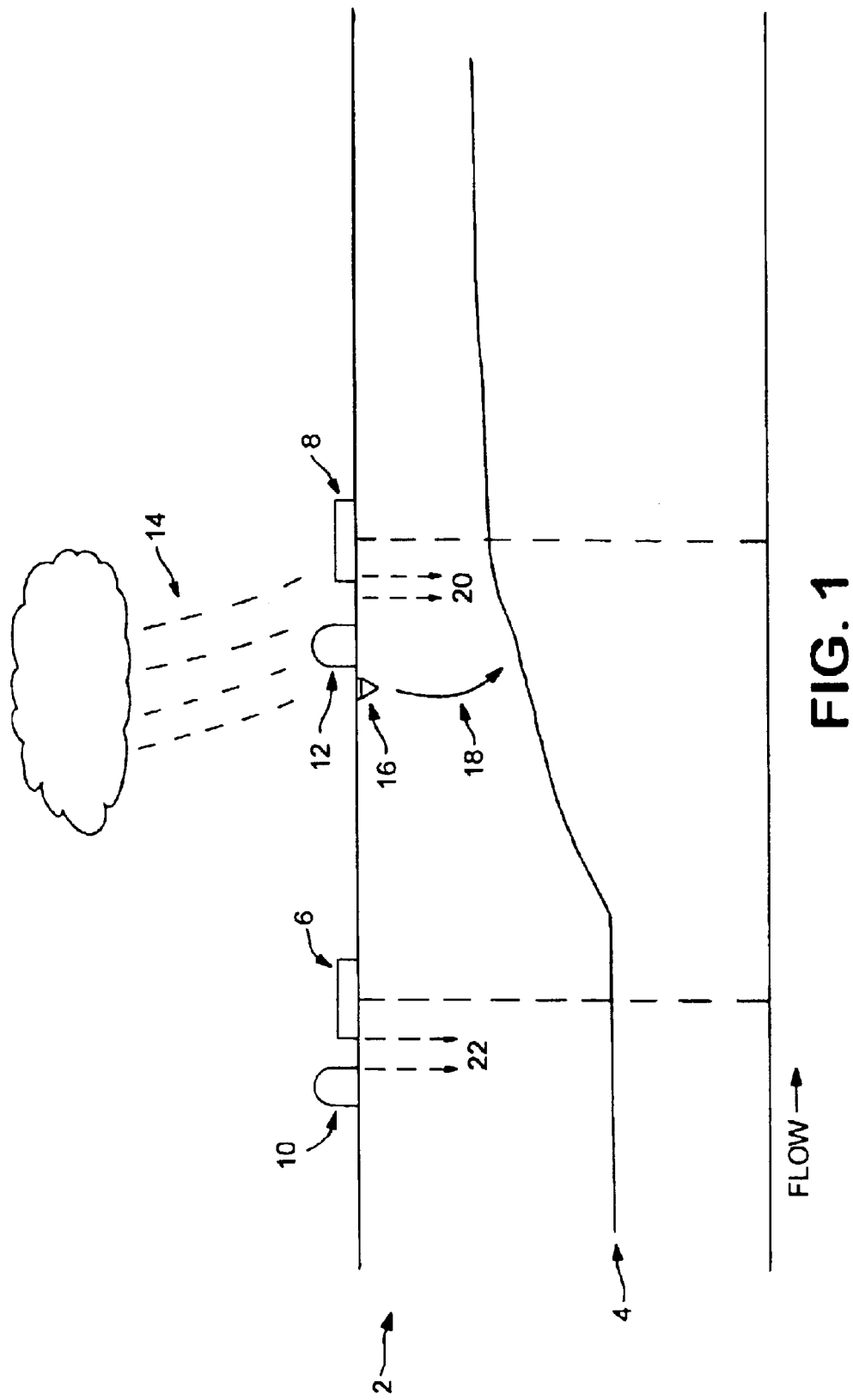
FIG. 1 illustrates an exemplary sewer network experiencing inflow and infiltration during a precipitation event.

FIG. 1 provides an illustration of the general concepts of rain-dependent inflow and infiltration on an exemplary sewer network. Referring to FIG. 1, a sewer network 2 contains a wastewater substance 4 that flows within the sewer network. Various flow monitors 6 and 8 are stationed at various points throughout the sewer network. Each flow monitor measures the velocity and/or volume and/or other parameters relating to the flow at a monitoring point within the sewer network. The monitors may be of any standard design or type that is capable of measuring flow velocity, either directly or indirectly by performing calculations on one or more measured parameters. Such a monitor is described in, for example, U.S. Pat. No. 5,198,989, to Petroff; U.S. Pat. No. 4,630,474, to Petroff; and U.S. Pat. No. 4,397,191, to Forden.

One or more rain gauges such as 10 and 12 are also stationed at various points above the sewer network to collect precipitation data such as rain and/or snow volume, precipitation event duration, and precipitation event intensities. During a precipitation event 14 such as a period of rain, rain may enter the system 2 through direct discharge points 16, such as a storm drain or other opening into the sewer network, where the rain becomes inflow 18 into the sewer network. Alternatively, the precipitation may seep into the sewer network as infiltration 20 through soil and/or other earthen materials, as well as through cracks and other openings within the sewer network above and/or under the soil. Typically, inflow 18 occurs during the rain event and for a brief period of time after the rain event as storm water runoff flows into a storm drain. Infiltration 20, however, typically occurs for a longer period of time as precipitation migrates through soils, rocks, and other materials before reaching the sewer network. For example, FIG. 1 illustrates that infiltration 22 is occurring even though the precipitation event 14 has passed beyond the point of the infiltration 22.

The amount and the locations of the monitors, rain gauges, precipitation events, and flow volumes illustrated in FIG. 1 are merely intended as illustrative of an example of a sewer network that is equipped with the present invention. Any number and location of monitors and rain gauges may be used in connection with any precipitation event.

Figure 2:
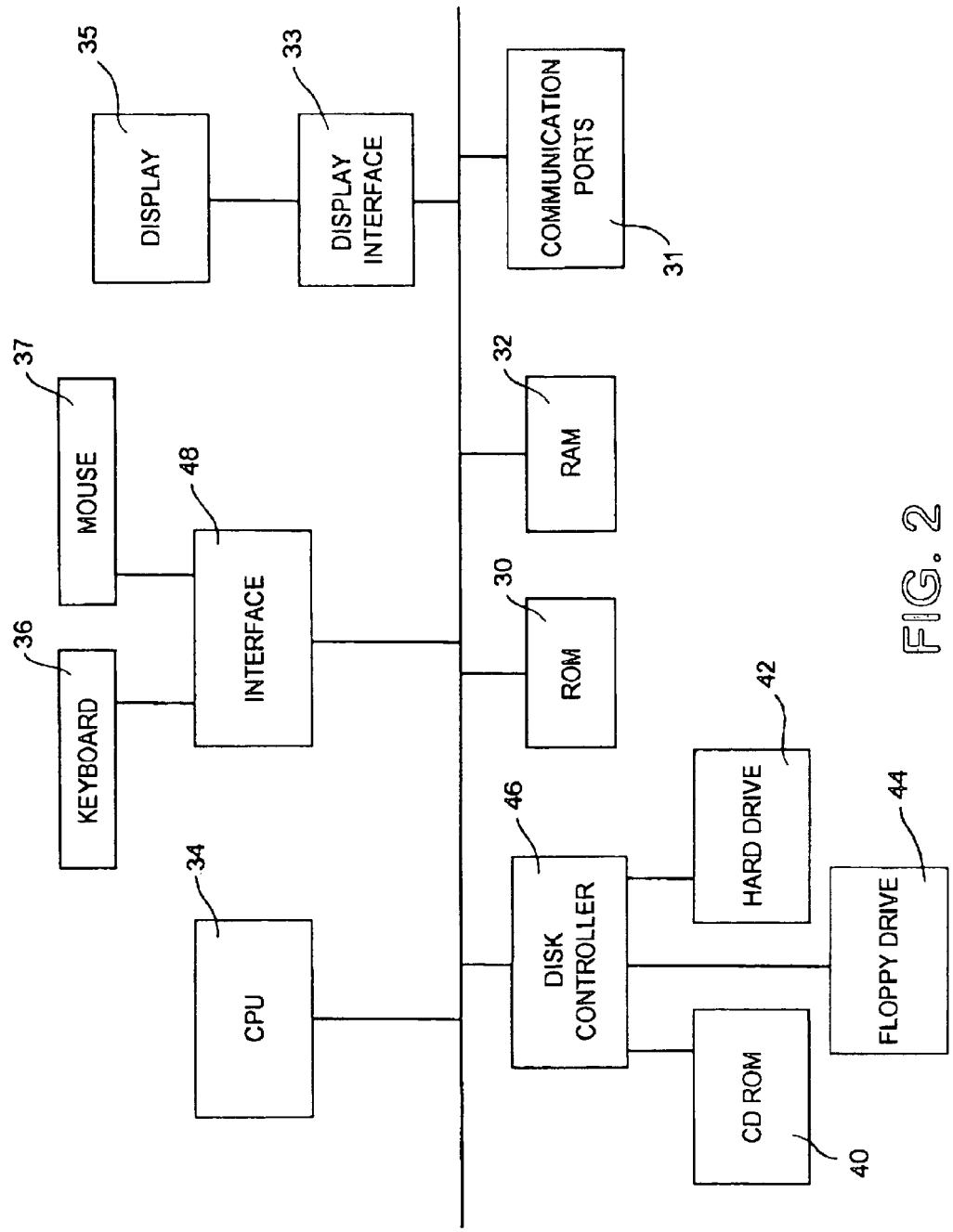
FIG. 2 is an internal diagram of an exemplary computing device having a processor and a memory.

The present invention employs a computer system using a computer processor and a memory. An internal diagram of such a system is illustrated in FIG. 2. At a minimum, the system includes one or more memory devices 30 and 32 and a processor 34. The computer also includes a communications port 31 that serves to receive data from the flow monitors and rain gauges. Each rain gauge and each flow monitor is in communication with the computer system, whether by direct wiring or through a remote communication medium, such as dial-in lines, a wireless transceiver, and/or an Internet connection. Optionally, the computer system may be integral with one or more of the rain gauges or flow monitors. The data collected by the rain gauges and flow monitors is delivered to the processor and memory for storage, analysis, and use.

Figure 3:
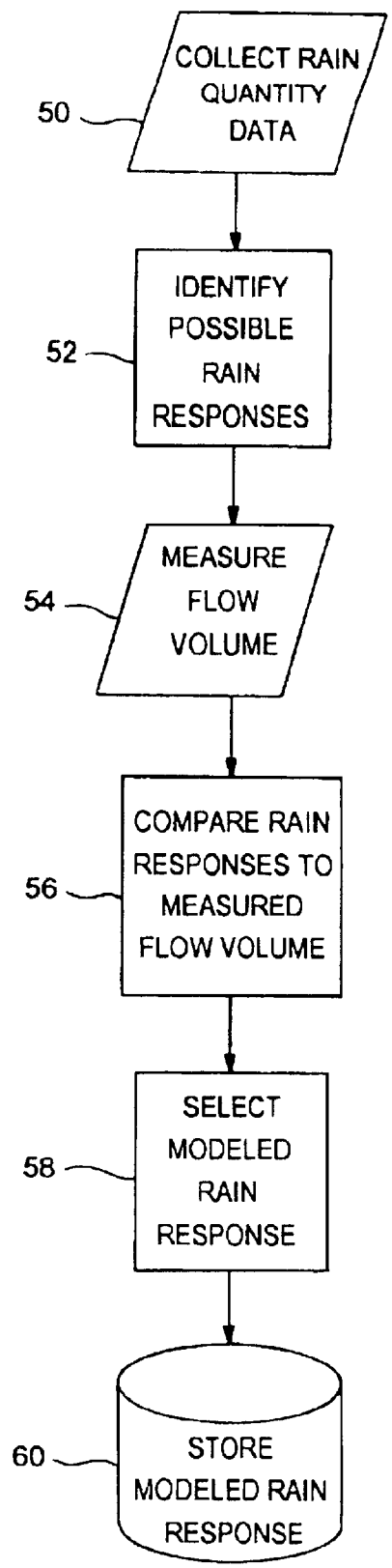
FIG. 3 is a flowchart that illustrates the steps by which the present invention may learn the effects of inflow and infiltration on a sewer network.

The processor uses the data collected by the flow meters and rain gauges to learn the sewer network's typical response to a precipitation event and to predict the effects of future precipitation events, in real time as they occur. FIG. 3 illustrates the steps that such a system may perform to learn the rain response of a sewer network to a precipitation event. These steps include the collection 50 of rain quantity data over one or more discrete periods of time. The time periods are relatively brief, in each case less than a twenty-four hour period, and preferably in smaller intervals such as five-minute intervals, ten-minute intervals, fifteen-minute intervals, thirty-minute intervals, or any other interval that is less than twenty-four hours. The smaller the interval, the better that the system may anticipate rain responses, as the system will have data related to smaller time increments.

Using the processor, the system then generates 52 one or more possible rain responses representing the increase in flow that the sewer network will experience over a period of time in response to the rain. Preferably the system generates a large number of rain responses, such as one hundred, two hundred, or more in order to provide multiple possibilities of rain response prediction. Using a display, each rain response may be optionally depicted as a hydrograph showing an immediate response to the inflow and/or infiltration of the rain, with an abrupt or gradual decrease in flow as the system returns to normal conditions after the rain event.

The system also collects 54 data representative of actual flow volume and compares 56 the possible rain responses identified in step 52 to the actual flow volume. Using a goodness of fit test to compare the rain responses to measured flow volume, the system selects 58, as the modeled rain response, the possible rain response having the best fit with the measured flow volume. The modeled rain response is stored 60 in a database, along with its corresponding rain quantity and rain time interval. The steps illustrated in FIG. 3 are preferably repeated over multiple time intervals, as well as during multiple rain events, in order to provide a broadly populated database of possible rain responses corresponding to varying rain intensities and rain time intervals. In addition, the process may be repeated for different flow monitors and rain gauges to provide data relating to various locations throughout the sewer network.

Optionally and preferably, the steps illustrated in FIG. 3 are periodically repeated over various time periods, such as weekly, monthly, and/or annually, to provide periodic, automatic calibration of the modeled rain response. In addition, as such time periods pass, the database of possible rain responses become more populated, thus providing more accurate determination of the modeled rain response over time.

Figure 4:
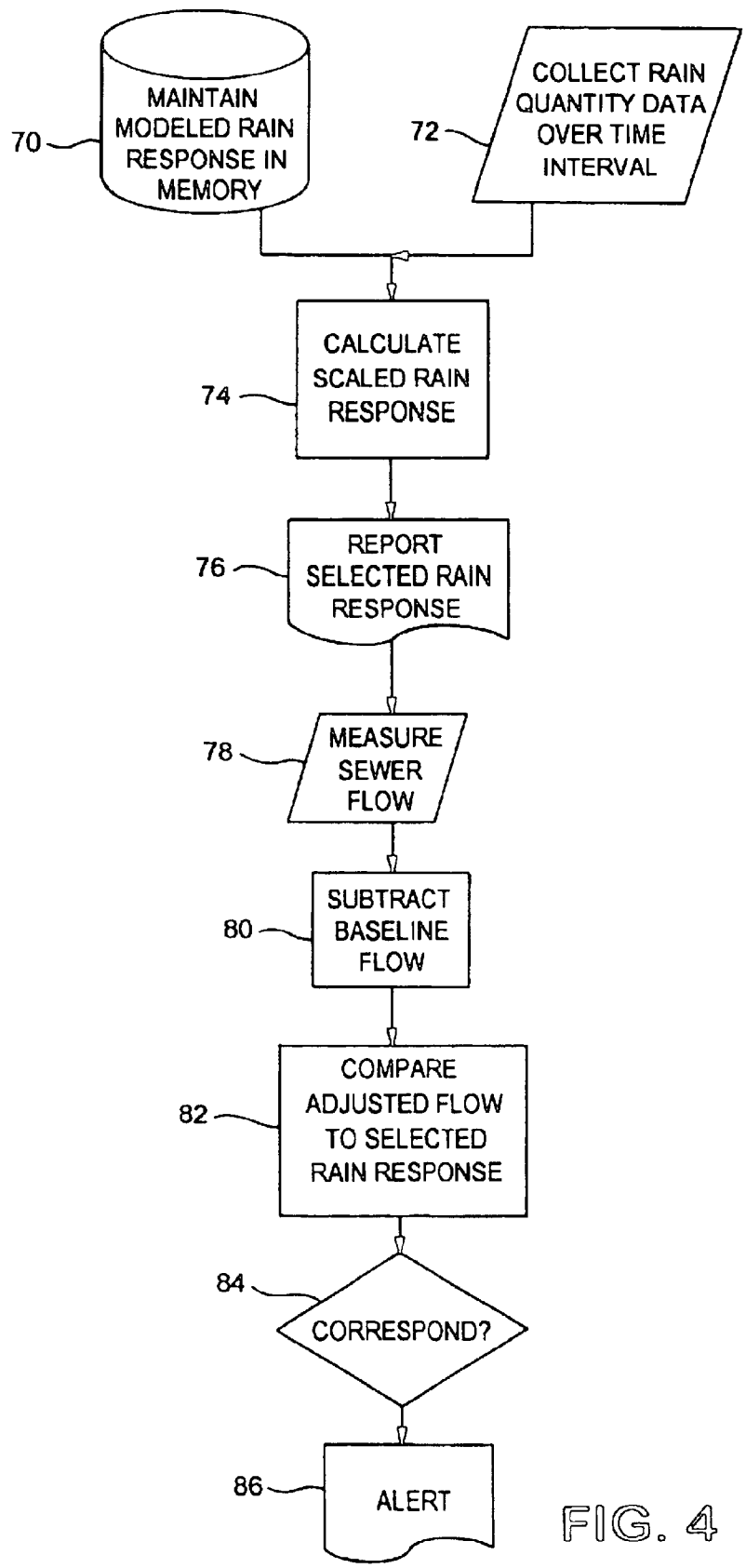
FIG. 4 is a flowchart that illustrates the steps by which the present invention may anticipate the effects of a precipitation event on a sewer network.
Figure 6:
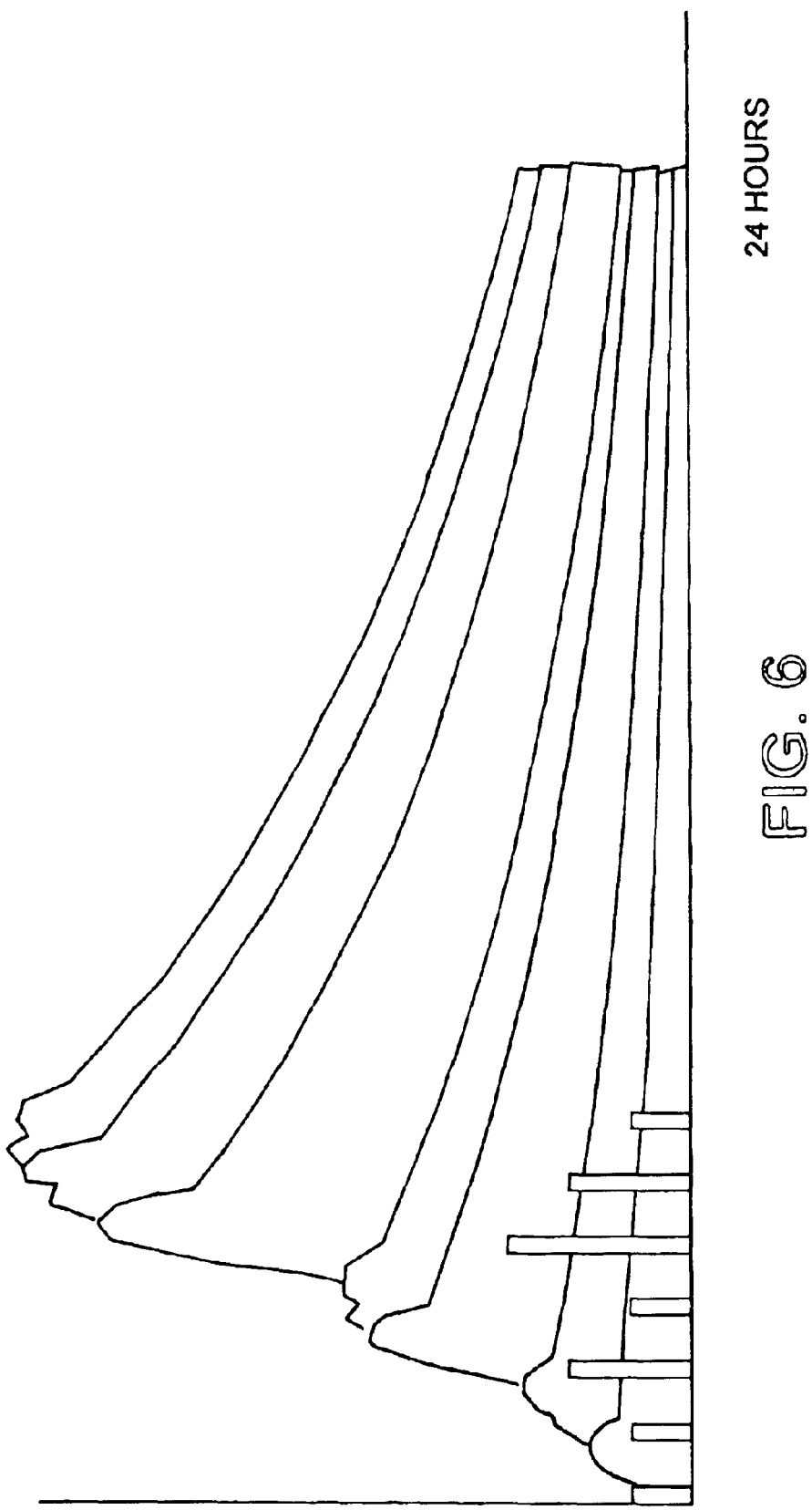
FIG. 6 illustrates an exemplary accumulation of rain responses in accordance with the present invention.

FIG. 4 illustrates the steps that the present invention may follow to predict a rain response using the data that was collected and stored as shown in FIG. 3. Referring to FIG. 4, the system maintains 70 the modeled rain responses in a memory, and it receives 72 actual rain quantity data over a time interval from one or more flow monitors. The system then calculates 74 a scaled rain response as a function of the modeled rain response and the rain quantity. The function is preferably done by multiplication of the modeled rain response, which corresponds to a known rain quantity, by the factor by which the actual rain quantity exceeds the known rain quantity. A graphic illustration of an exemplary multiplication of a modeled rain response by a rain quantity in a time interval is illustrated in FIG. 9. Returning to FIG. 4, the scaled rain response is then reported 76. This report maybe in the form of a direct communication to a user via a display, electronic mail, sonic alert, printout, or other communications medium, or the reporting maybe simply the delivery of the selected rain response data to a processor, a storage medium such as a computer memory, or a transmission medium such as an analog or digital signal for further handling, use, or storage. Steps 72–74 may be repeated, and the scaled rain responses summed, to yield a cumulative rain response (as described below in the discussion relating to FIG. 6).

The scaled or cumulative rain response may be used to determine whether sewer network problems, such as pipe leaks, overflows, or monitor errors are occurring by comparing the selected rain response to actual measured data. These steps, which also are illustrated in FIG. 4, include the steps of measuring 78 actual sewer flow, using a flow monitor, and subtracting 80 a baseline flow from the measured sewer flow. The baseline flow represents the flow that normally occurs at the flow monitor's location during non-precipitation conditions, and the subtraction of baseline flow from measured sewer flow results in an adjusted flow that is representative of the inflow and infiltration on the system from the rain event. The system then compares 82 the adjusted flow to the scaled or cumulative rain response to determine whether the adjusted flow substantially corresponds to the scaled or cumulative rain response. If there is a substantial difference between the adjusted flow and the selected rain response, then the system may alert 86 a user or another system or device of a potential problem in the sewer network. The alert may be, for example, a direct communication to a user via a display, electronic mail, sonic alert, printout, or other communications medium, or the alert may be as simple as the delivery of the correspondence data to a processor, a storage medium such as a computer memory, or a transmission medium such as an analog or digital signal for further handling, use, or storage.

The determination of scaled rain response may also be used to calculate or predict net flow between two points in a sewer network. For example, if flow is measured at an upstream point in the network, the system can predict the flow at a downstream location using the scaled determination of inflow and infiltration. The prediction may also be configured to account for the amount of time that it takes a unit of flow to travel from the upstream location to the downstream location.

Figure 5:
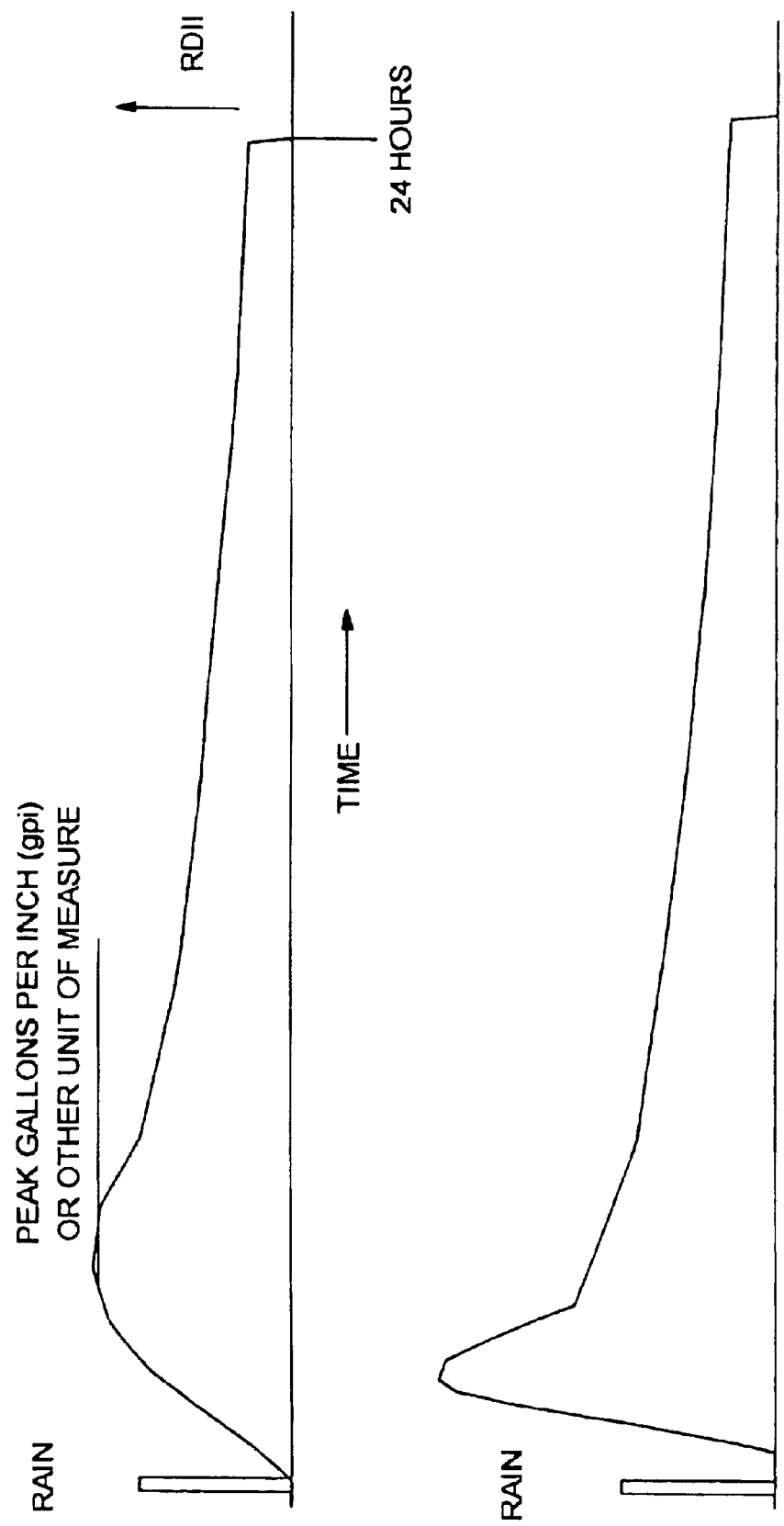
FIG. 5 illustrates exemplary rain responses to a measured rain event.

FIGS. 5–8 provide a graphic illustration of the determination of rain response following the steps of FIG. 2. Referring to FIG. 5, a sewer network's response to an interval of rain may be illustrated as a hydrograph. A hydrograph is a graph showing a property of a fluid, in this case sewer flow volume, over a period of time. In FIG. 5, the fluid property is shown on a y-axis and the time is shown on the x-axis. The graph typically follows the shape of a parabola, sine wave, or other shape having a rising portion, a crest or a peak, and a hyperbola or recession curve. Examples of two hydrographs of rain responses over a period of time, such as twenty-four hours, are illustrated in FIG. 5. Different sewer networks, different locations within a sewer network, and even different rain events having different intensities and/or time intervals will yield different rain responses, as illustrated by the two different hydrographs in FIG. 5. A similar type of graph, a hyetograph, would illustrate a quantity of rain over a period of time.

Figure 7:
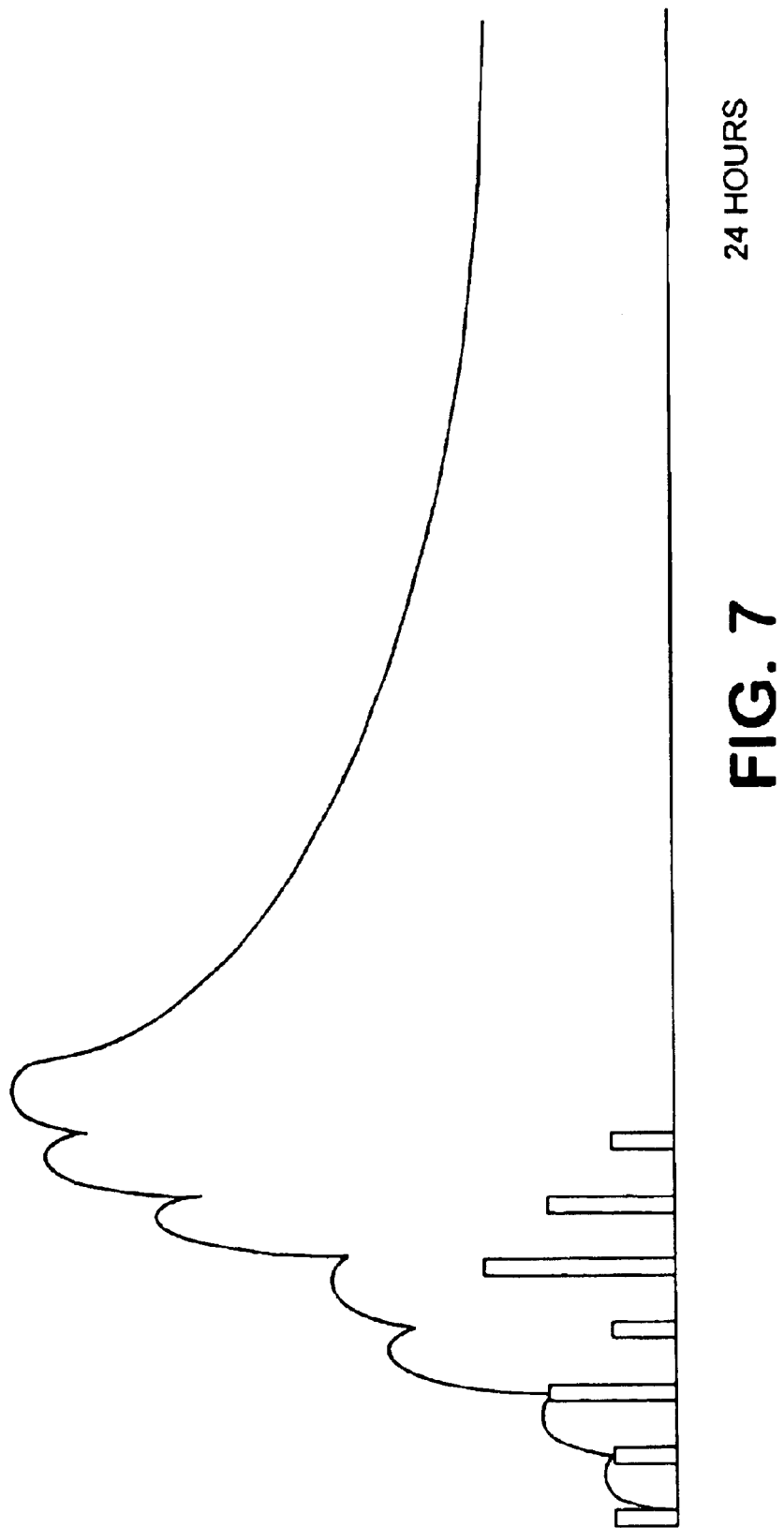
FIG. 7 illustrates an example of a total computed rain response.
Figure 8:
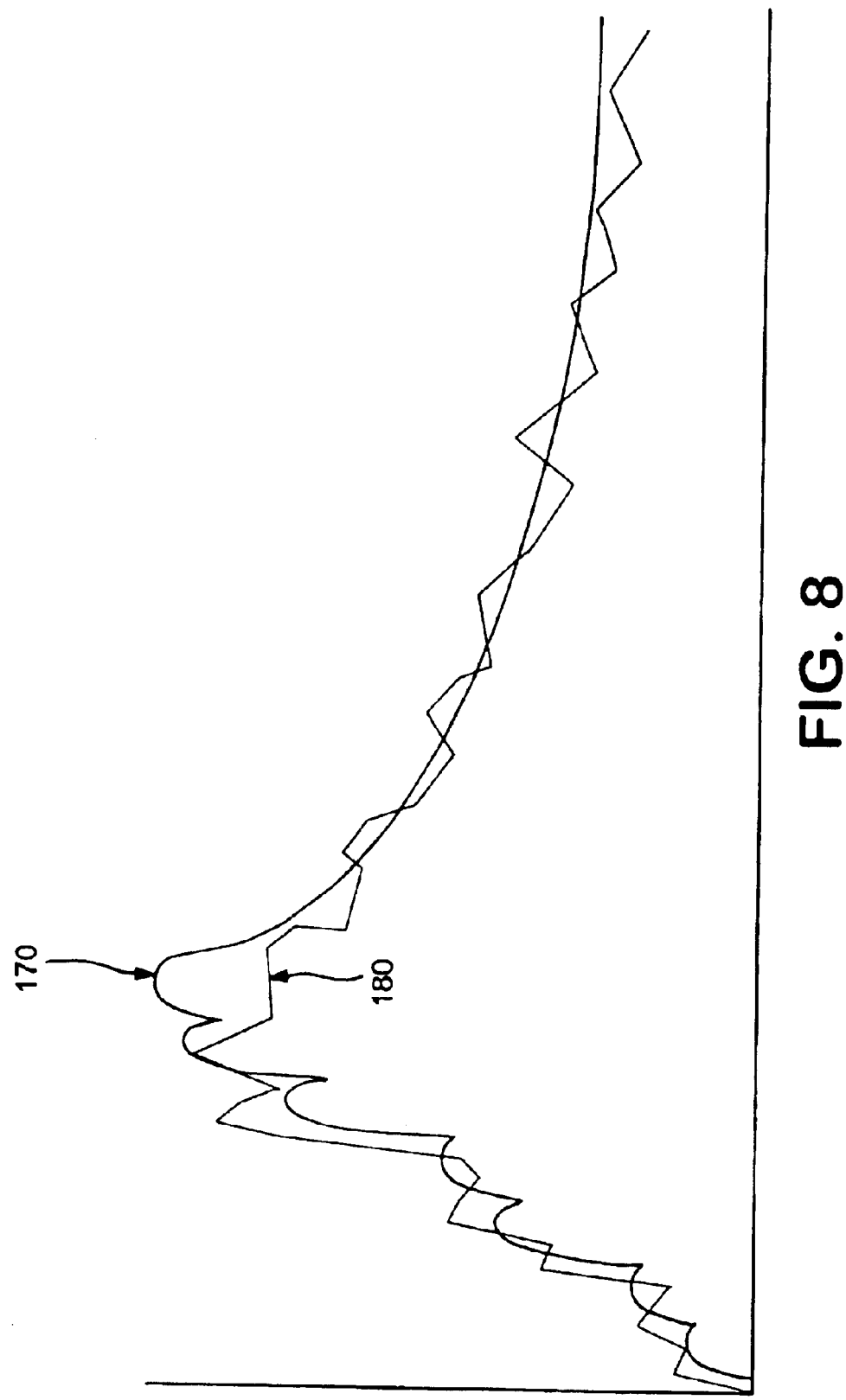
FIG. 8 illustrates the comparison of an exemplary computed rain response with an exemplary actual rain response.

As noted above, each interval of rain represents only a portion of an overall rain event, such as a period during which an inch of rain is received, or a period within which 1/100th of an inch of rain is received, or any interval of a total rain event. The overall rain response is determined by accumulating a plurality of hydrographs as illustrated by example in FIG. 6. For example, the first rain tip may yield a rain response identified as curve 100, while the second rain tip, which occurred after the rain tip, would yield a peak that is later in time. The response curves for the second tip 110, the third tip 120, and any number of additional tips are added to the first rain response curve to yield a total rain response. This continues for as many rain increments as desired to yield the overall rain response of the system. After several overall rain responses are computed, an example of which is illustrated in FIG. 7 as 170, FIG. 8 illustrates that the computed overall rain response 170 may be compared to the actual rain response 180 to find the computed rain response that has the best fit with the actual rain response. This comparison is done using a goodness of fit test, such as the such as the Kolmogorov-Smirnov test, the Pearson's chi-square test, or any other such test.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, all of which may fall within the scope of the invention.

What is claimed is:

1. A sewer network flow analysis system, comprising:
   a processor;
   a memory in communication with the processor;
   a rain gauge in communication with the processor; and
   a flow monitor in communication with the processor,
   the processor being programmed to accept, from the rain gauge, data representative of a first measured rain quantity at a first location over a first time interval that is less than a twenty-four-hour period;
   the processor being further programmed to generate a plurality of possible rain responses, each possible rain response comprising a distribution of possible flow volumes at a second location over a second time interval, the second time interval having a duration that is longer than a duration of the first time interval;
   the flow monitor being configured to measure a flow volume distribution at the second location over the second time interval;
   wherein the processor is further programmed to compare the plurality of possible rain responses to the measured flow volume distribution, and to select one of the possible rain responses using a result of the comparison; and
   wherein the memory is configured to store the selected rain response, the first measured rain quantity, and the first time interval.

2. The sewer network flow analysis system of claim 1,
   wherein the processor is further programmed to accept, from the rain gauge, data representative of a second measured rain quantity at a first location over a third time interval; and
   wherein the processor is further programmed to calculate a scaled rain response, the scaled rain response comprising a function of the selected rain response and the second measured rain quantity; and
   wherein the processor is further programmed to report, in real time, the scaled rain response.

3. The sewer network flow analysis system of claim 2, wherein the second location is a location within a sewer network, and wherein the processor is further programmed to calculated the scaled rain response using no additional data relating to either the sewer network or any substance flowing within the sewer network.

4. The sewer network flow analysis system of claim 2,
   the processor being further programmed to convert the measured flow distribution into data representative of a measured flow at the second location, and to subtract a baseline flow from the measured flow to obtain a result comprising data representative of an adjusted flow, wherein the baseline flow corresponds to a non-precipitation event; and
   the processor being further programmed to compare the adjusted flow to the selected rain response to determine whether the adjusted flow substantially corresponds to the selected rain response.

5. The sewer network flow analysis system of claim 4,
   wherein, when the processor determines that the adjusted flow does not substantially correspond to the selected rain response, the processor is further programmed to report an alert.

6. The sewer network flow analysis system of claim 1, wherein the processor is further programmed to select one of the possible rain responses by performing a goodness of fit test on the measured flow volume distribution and the plurality of possible rain responses.

7. The sewer network flow analysis system of claim 1, wherein the processor is further programmed to graphically represent the selected rain response as a curve on a graph on which a y-axis represents at least one of inflow and infiltration and an x-axis represent time.

8. The sewer network flow analysis system of claim 1, wherein the duration of the first time interval is shorter than a duration of a corresponding precipitation event.

* * * * *